United States Patent [19]

Aihara et al.

[11] Patent Number: 4,623,777
[45] Date of Patent: Nov. 18, 1986

[54] APPARATUS FOR BUTT WELDING STEEL STRIPS BY USING A LASER BEAM IN A STEEL STRIP-PROCESSING LINE

[75] Inventors: Masaki Aihara; Noboru Tsuruta; Yoshito Kawai; Hiroaki Sasaki, all of Chiba, Japan

[73] Assignee: Kawasaki Steel Corporation, Kobe, Japan

[21] Appl. No.: 584,125

[22] Filed: Feb. 27, 1984

[30] Foreign Application Priority Data

Feb. 28, 1983 [JP] Japan .............................. 58-28664[U]

[51] Int. Cl.⁴ .............................................. B23K 26/00
[52] U.S. Cl. ........................... 219/121 L; 219/121 LC; 219/121 EC; 219/121 LY
[58] Field of Search .................. 219/121 LC, 121 LD, 219/, 121 EC, 121 ED, 121 PJ, 121 PK, 161, 121 LY

[56] References Cited

U.S. PATENT DOCUMENTS

| Re. 29,815 | 10/1978 | Gnanamuthu | 219/121 LD |
| 3,665,367 | 5/1972 | Keller et al. | 219/121 L |
| 3,816,696 | 6/1974 | Wheeler et al. | 219/161 X |
| 4,323,756 | 4/1982 | Brown et al. | 219/121 LM X |

FOREIGN PATENT DOCUMENTS 163088 12/1981 Japan ........................... 219/121 LC

*Primary Examiner*—M. H. Paschall
*Attorney, Agent, or Firm*—Balogh, Osann, Kramer, Dvorak, Genova & Traub

[57] ABSTRACT

A laser-welding apparatus including a pair of clamps at least one of which is movable reciprocally along the steel strip-feed line direction and which are adapted to clamp the edge portions of preceding and trailing steel strips, a shear which is advanceable and retractable between the pair of the clamps in a perpendicular direction to the line and cuts the edge portions of the preceding and trailing steel strips, a device for butting the cut faces of the preceding and trailing steel strips while being clamped by means of the clamps, a device for continuously feeding a filler wire at a weld zone at which the laser beam is condensed, and a laser torch adapted to condense a laser beam from a laser oscillator on an off-line at a weld zone and movable in the width direction of steel strips to be welded together.

16 Claims, 40 Drawing Figures

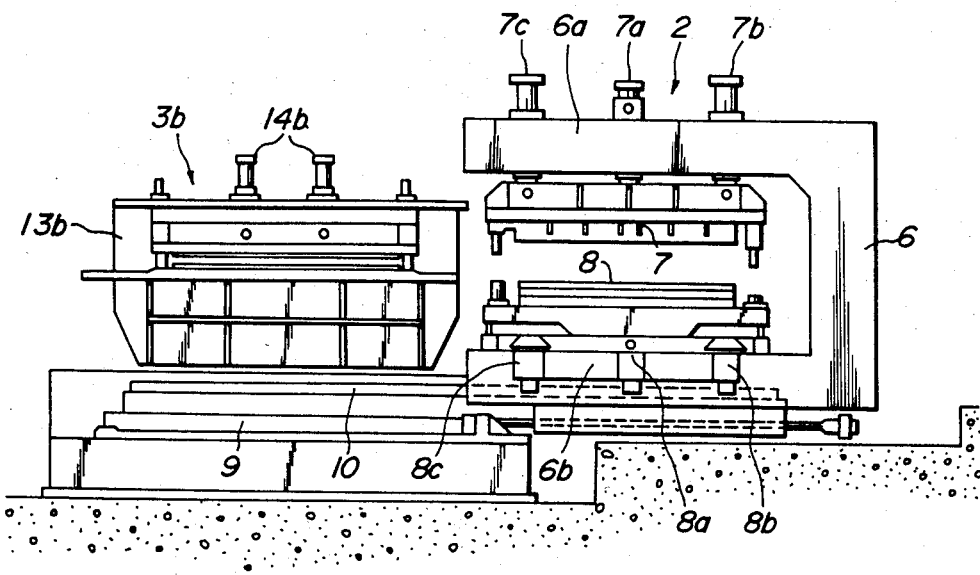
FIG_2
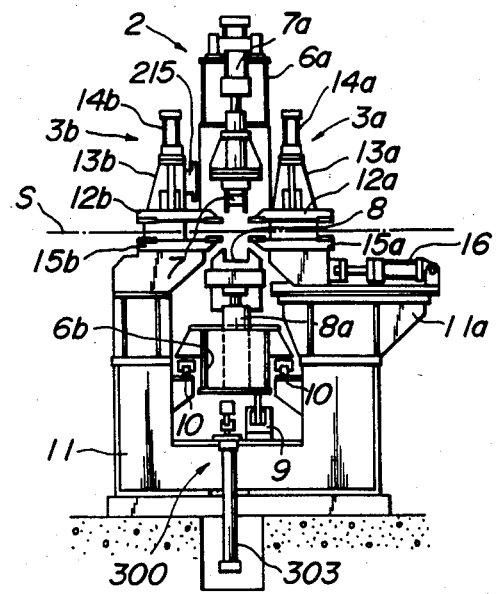
FIG_3

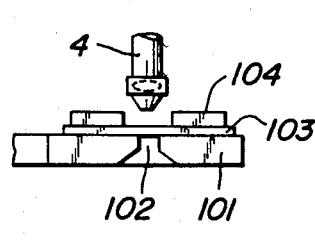
FIG_6a
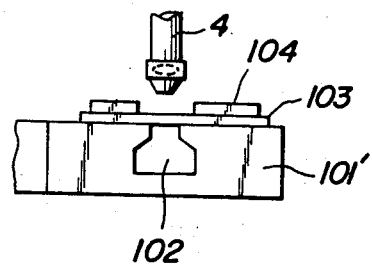
FIG_6b
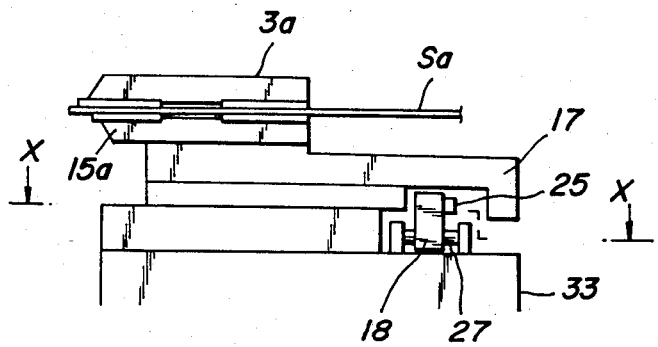
FIG_7
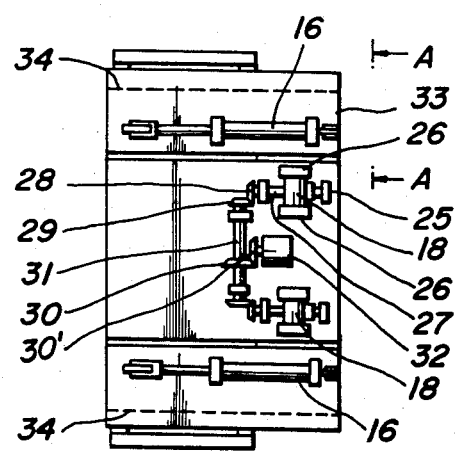
FIG_8

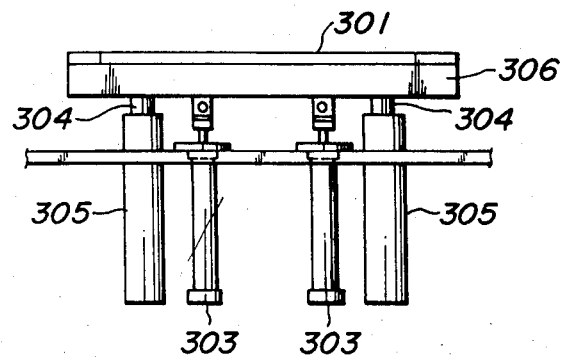
FIG_13
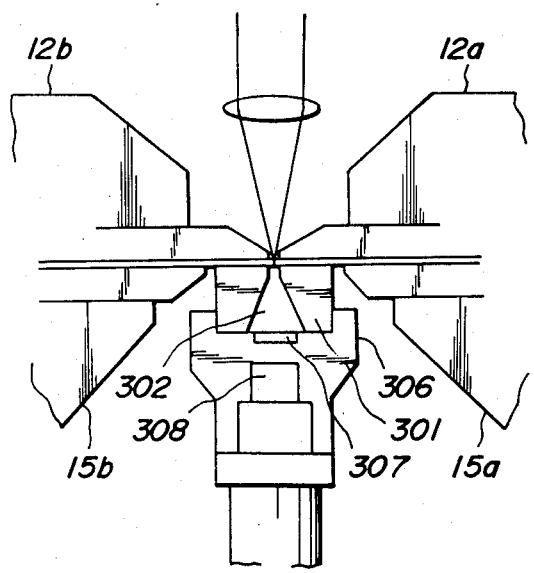
FIG_14
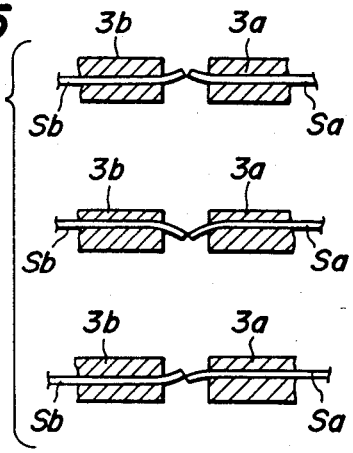
FIG_15

FIG_16a
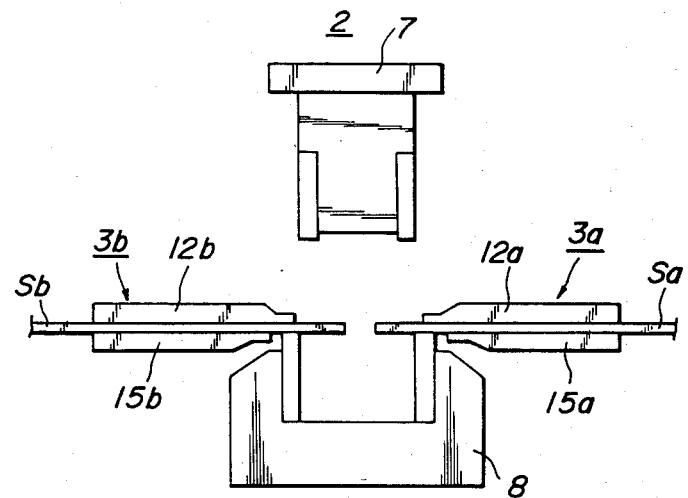
FIG_16b
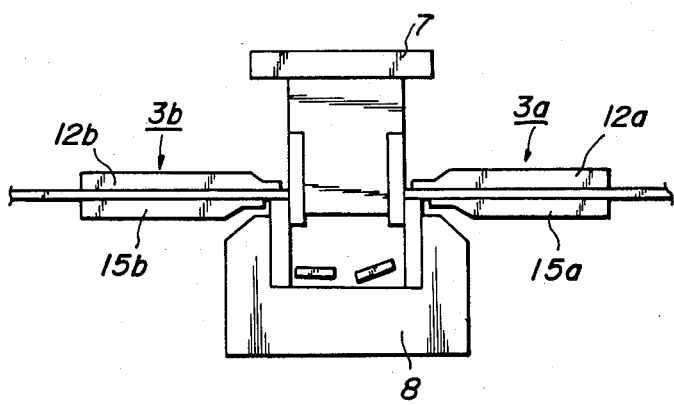

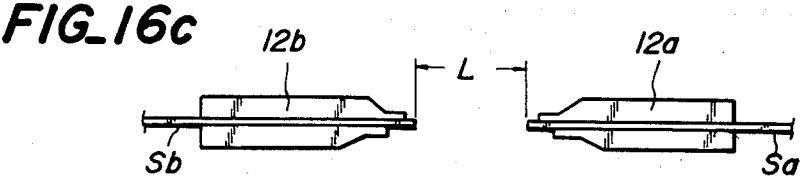
FIG_16c
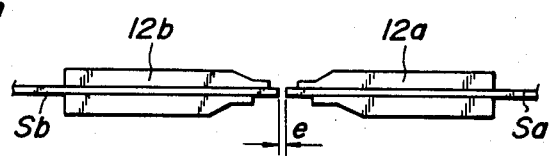
FIG_16d
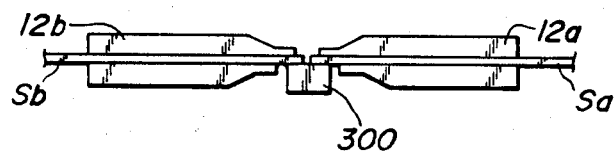
FIG_16e
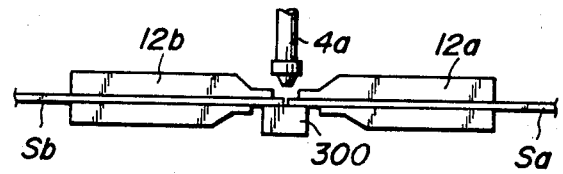
FIG_16f

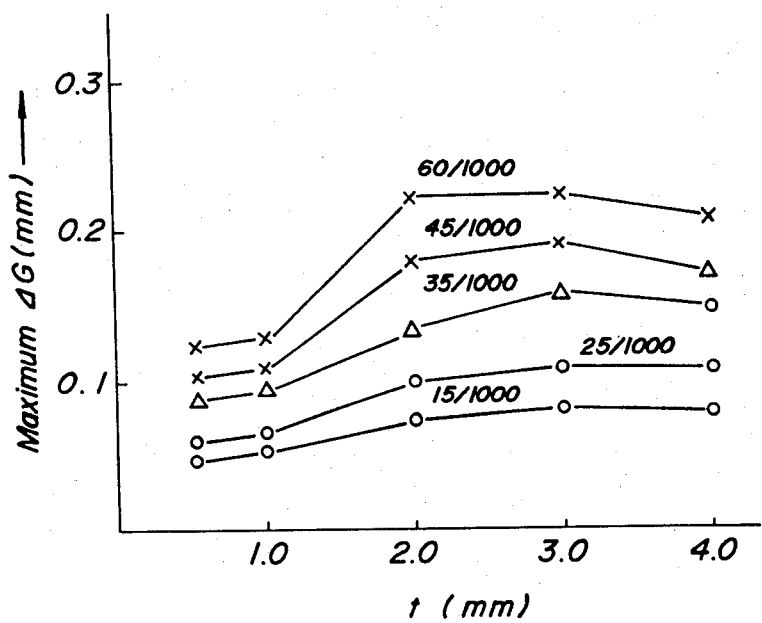
FIG_19

FIG_20
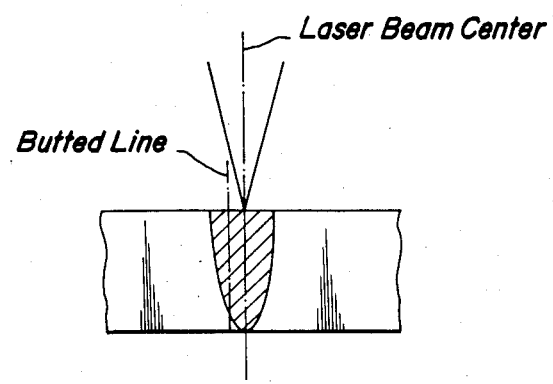
FIG_21a
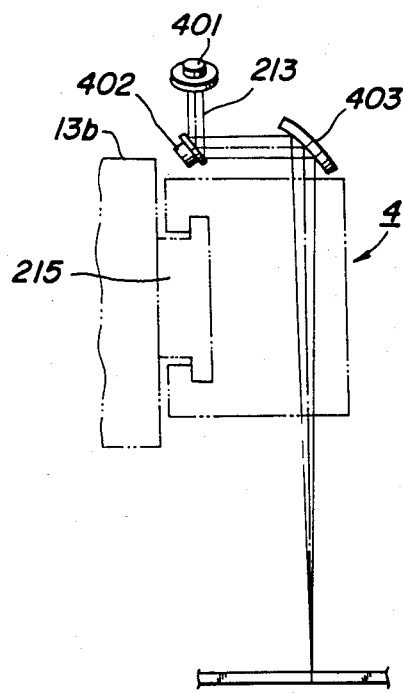
FIG_21b
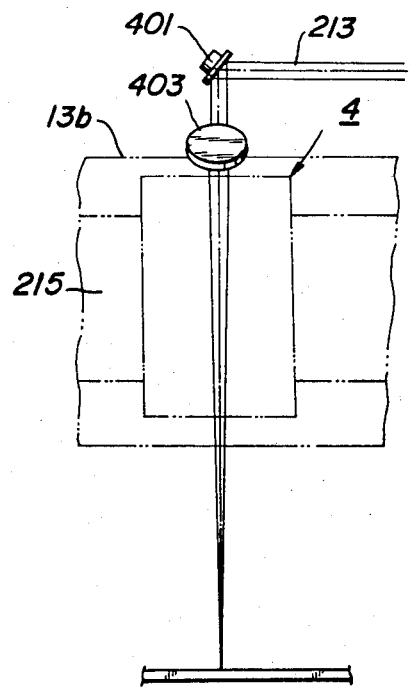

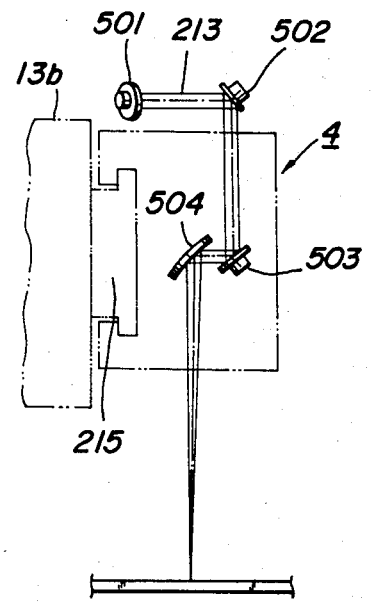
FIG_22a
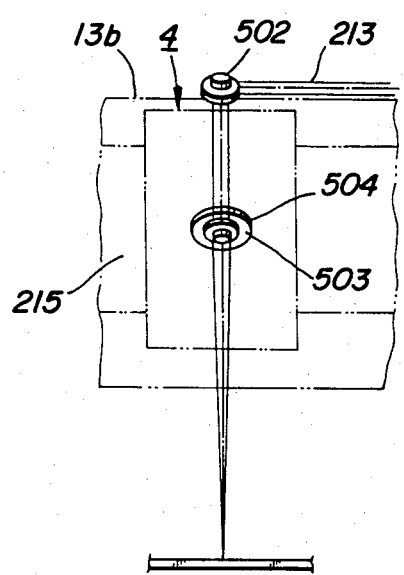
FIG_22b

FIG_28
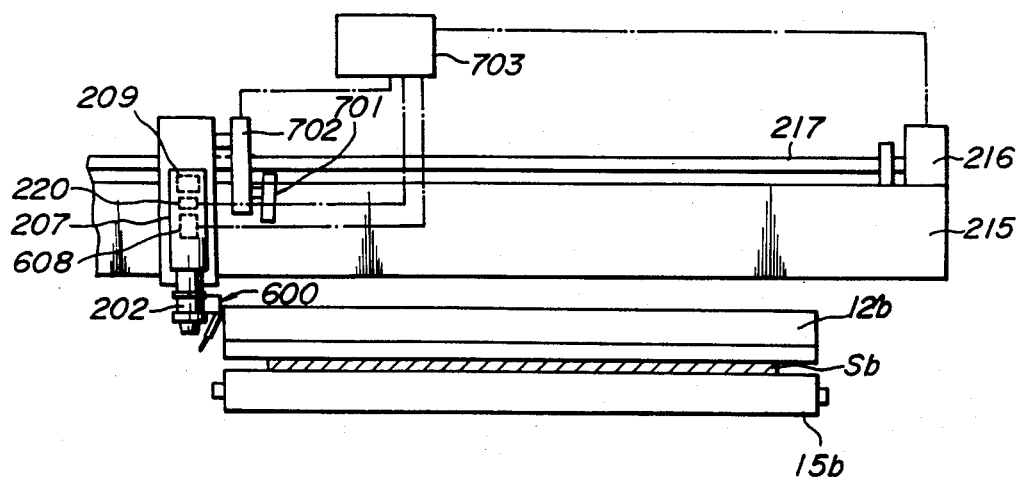

APPARATUS FOR BUTT WELDING STEEL STRIPS BY USING A LASER BEAM IN A STEEL STRIP-PROCESSING LINE

BACKGROUND OF THE INVENTION (1) Field of the Invention

The present invention relates to an apparatus for butt welding steel strips by means of a laser beam (hereinafter referred to as "laser butt welding apparatus") in a steel strip-processing line.

(2) Description of the Prior Art

In a steel strip steel processing line, steel strips are joined together at an entry section of the line, and fed to a latter stage processing and continuously treated and produced. The steel strips have been conventionally jointed by a seam welding machine, a flash butt welding machine, an arc welding machine such as TIG arc welding machine. These welding methods have their own peculiar characteristics respectively. The seam welding is characterized in that the welding is possible at a high speed in a short time, but the thickness of the welded portion becomes 180–130% of that of the base metal because the steel strips are welded by piling their edges one upon another. Therefore, the welded portion can not be rolled in a coil by taking the problem such as buckling into account. If a scale is present on the surface of the steel strip as in the case of a hot-rolled steel strip or the like, this method has the defect that the surface must be ground prior to the welding. Further, in the case of the welding of thin steel strips, since the strips are pressed by means of electrode wheels, this method has the drawback that the profile of junction and the vicinity thereof are deteriorated.

The flash butt welding can make the welding time shorter than the seam welding because the steel strips are welded at one time over their whole width in the former method, but thin steel strips are likely to be bent due to upsetting step, so that this method has the defect that it is applicable to the relatively thick steel strips of not less than 1.6 mm, but is not applicable to the thin steel strips. It also has the defect that it is inapplicable to special steels such as silicon steel, stainless steel, high carbon steel because of oxidation, a large heat input and the coarse grain growth at the welded portion and heat affected zone when the flashing is effected. As a result, the use of flash butt welding is generally restricted to the welding of the low carbon steel strips of not less than 1.6 mm in thickness.

According to TIG arc welding, it is possible to improve the quality of the welded portion through addition of a filler wire or the like, and therefore, this method can be used for stainless steel. However, since the heat input is large, it has the defect that it is inapplicable to the material such as the silicon steel in which the coarse grains are likely to grow. Further, it also has the defects that the welding speed is slow, and the welding time is long.

As mentioned above, although the conventional seam welding, flash butt welding, TIG arc welding and the like have been used by utilizing the respective characteristics, they can not be applied to the silicon steel or the like.

As such a welding machine, the inventors have proposed a laser butt welding apparatus.

In the case of the laser butt welding of the steel strips, particularly made of high Si steel (Si≧0.8%) and high carbon steel (C≧0.3%), it has been found that the welding strength is enhanced by the provision of a filler wire at the butted edges of the steel strips to be welded together.

In such a welding method, it is common practice that the welding is done at a beam diameter of about 0.2–0.8 mm with respect to the gap of 0.05–2 mm between the butted edges of the steel strips. Before carrying out the butt-welding, the edge portions of the steel strips are cut by means of a shear, but there is the possibility that a uniform lateral gap between the edges of the steel strips is not formed, or the track of the laser beam is not coincident with the center line of the gap due to a poor precision of the shear.

This phenomenon will be elucidated in more detail with reference to FIG. 27(a).

FIG. 27(a) illustrates the shape of the gap formed when the edges of the steel strips are butted with each other. Reference numerals Sa and Sb are preceding and trailing steel strips, and reference numerals 702 and 703 are the track of the laser beam and the center line of the gap between the butted edges of the steel strips respectively. At this state, the welding is carried out by running the laser beam along the straight line 702 in the transverse direction of the steel strips, while being kept at a constant position in the longitudinal direction without being adjusted to be longitudinally displaced, and by supplying a filler wire at a constant rate. But, the fused filler wire is lacking at the portions a and c, while to the contrary, the fused filler wire is in excess at the portions b and d. Particularly, the gaps at the positions a and c are not completely filled with the fused filler wire and the amount of the filler wire fused is not sufficient and the welding strength is poor. With respect to the positions b and d having the excessively fused filler wire, such a method is economically unfavorable.

Thus, there has been demanded a welding apparatus which can weld the special steels such as silicon steel or the like.

SUMMARY OF THE INVENTION

An object of the present invention is to provide an automatic laser butt welding apparatus for butt welding steel strips in a steel-processing line by using a laser beam as a heat source.

More specifically, the object of the invention is to provide a laser butt welding apparatus usable for welding almost all kinds of the steels, for instance, special steels such as silicon steel, stainless steel or the like, a plated steel such as a galvanized steel or the like, and high tensile strength steels.

It is another object of the invention to provide a laser butt welding apparatus usable for usual steel strips having small to large thickness without limiting the thickness as in the case of the flash butt welding.

It is a further object of the invention to provide a laser butt welding apparatus which enables far higher speed welding than the TIG arc welding, and in a high efficiency.

It is a still further object of the invention to provide a laser butt welding apparatus which can stably provide a satisfactory welding strength even when the gap between the butted edges of the steel strips to be welded together is not uniform.

Still further object of the invention is to provide a method of laser butt welding which can stably provide an optimum welding strength even when the gap between the butted edges of the steel strips to be welded together is non uniform.

According to one aspect of the invention, there is a provision of a laser butt welding apparatus including an inlet clamp means and an outlet clamp means, at least one of which is movable forward and rearward along the steel strip-feed line direction and which are adapted to clamp the edge portions of a preceding steel strip and a trailing steel strip; each of said inlet and outlet clamp means having an upper clamp beam and a lower clamp beam; shearing means consisting of a preceding steel strip shear and a trailing steel strip shear, each having a lower shearing blade and an upper shearing blade which are independently movable upwards and/or downwards, the shearing means being advanceable and retractable between he pair of the clamp means in a perpendicular direction to the line and adapted to cut the edge portions of the preceding and trailing steel strips, by lowering the upper shearing blades, the edge portions of the preceding and trailing steel strips being firmly sandwiched between the lower shearing blades and the upper clamp beams while in the shearing operation; means for butting the cut faces of the preceding and trailing steel strips while being clamped by means of the clamp means; means for feeding a filler wire at a weld zone at which the laser beam is condensed, and a laser torch assembly including a reflector adapted to bend a laser beam irradiated from a laser oscillator placed on an off-line and a condenser adapted to condense the laser beam reflected by the bender mirror at a weld zone and a torch member for applying the laser beam focused by the condenser to the weld zone, which torch member is movable in a transverse (or width) direction of the steel strips to be joined.

According to another aspect of the invention by which the above object can be accomplished, there is a provision of a laser butt welding method in which the size of the gap between the butted edges of the members to be welded together and the center line of the gap are detected, and the supply rate of the filler wire to be filled into the gap is controlled based on the size of the gap, while the center of the laser beam is adjusted to be in concidence with the center line of the gap.

According to still another aspect of the invention by which the above object can be accomplished, there is a provision of a laser butt welding method in which the size of the gap between the butted edges of the members to be welded together and the center line of the gap are detected, and the supply amount of the filler wire to be filled into the gap is controlled based on the size of the gap by varying the welding speed, while the center of the laser beam is adjusted to be in coincidence with the center line of the gap.

According to a further aspect of the invention, there is the provision of an apparatus for performing the above laser butt welding method, including a filler wire supply means, a laser torch equipped with a driving means adapted to control the displacement of the laser torch in a steel strip processing direction of the members to be welded together, a detecting means for detecting the size and the location of the center line of the gap between the butted edges of the members, a controller for controlling the location of the laser torch in the line direction and the supply rate of the filler wire or the supply amount of the filler wire based on the detection signal from the detecting means in such a manner that the laser beam may be run along the center line of the gap between the butted edges of the members, and the supply rate or the supply amount of the filler wire may be proportional to the size of the gap.

These and other objects, features and advantages of the invention will be well appreciated upon reading of the following description of the invention when considered in connection with the accompanying drawings with understanding that some modifications, variations and changes could be easily made by the skilled in the art to which the invention pertains without departing from the spirit of the invention and the scope of the appended claims.

BRIEF DESCRIPTION OF THE ACCOMPANYING DRAWINGS

FIG. 2 is a side view of a clamp means and a shear in the laser butt welding apparatus in FIG. 1;

FIG. 3 is a front view of the laser butt welding apparatus in FIG. 1;

FIG. 6(a) is a side view of the station for checking the performances of the optical system in FIG. 5;

FIG. 6(b) is a side view of another embodiment of the station for checking the performances of the optical system;

FIG. 7 is a side view showing a butting means of an inlet clamp;

FIG. 8 is a plan view of the butting means of the inlet clamp as viewed from the direction of the arrow of X—X in FIG. 7;

FIG. 13 is a side view of a center clamp;

FIG. 14 is a detailed view of the center clamp in FIG. 13;

FIG. 15 is a sectional view illustrating the state in which the preceding steel strip and the trailing steel strip are improperly butted with each other;

Figure 17:
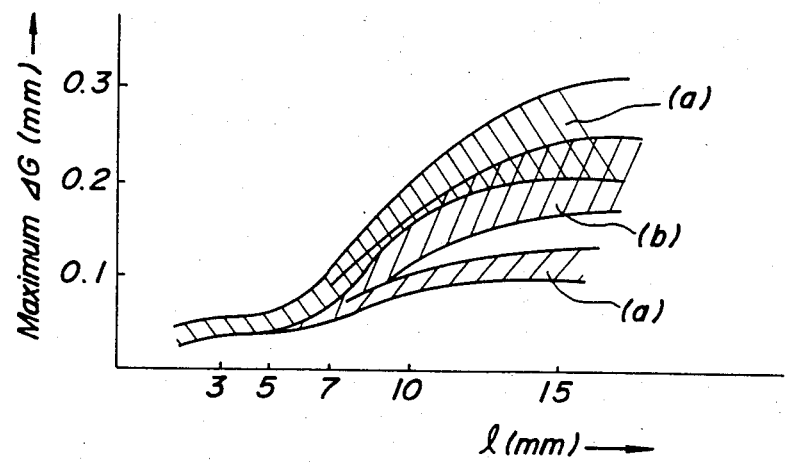
Figure 18:
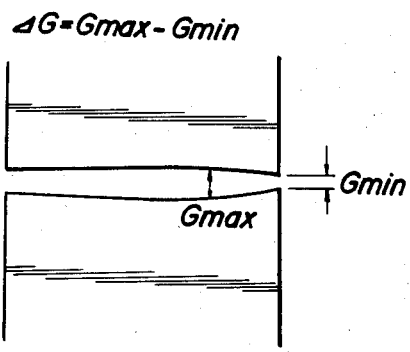
Figure 23:
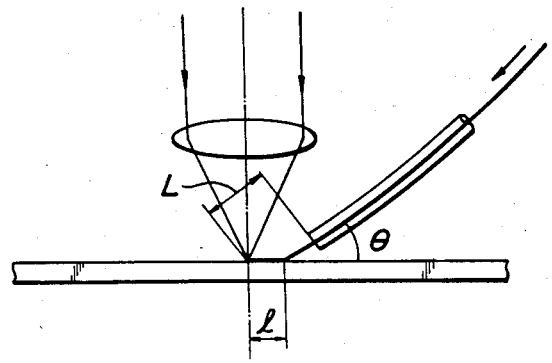
Figure 24:
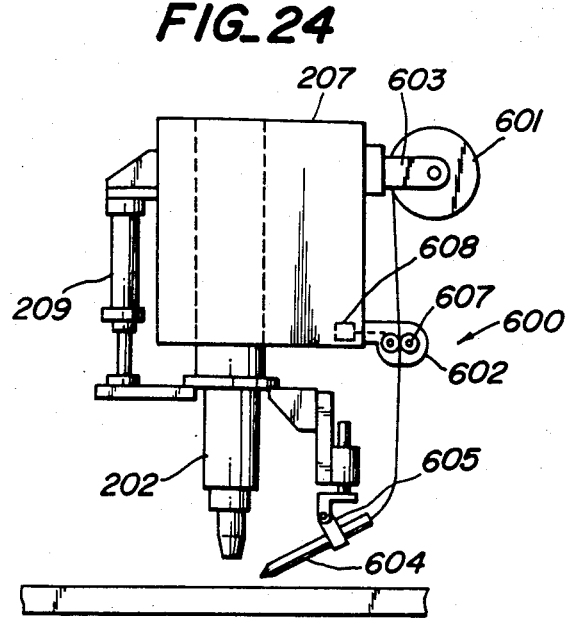
Figure 25:
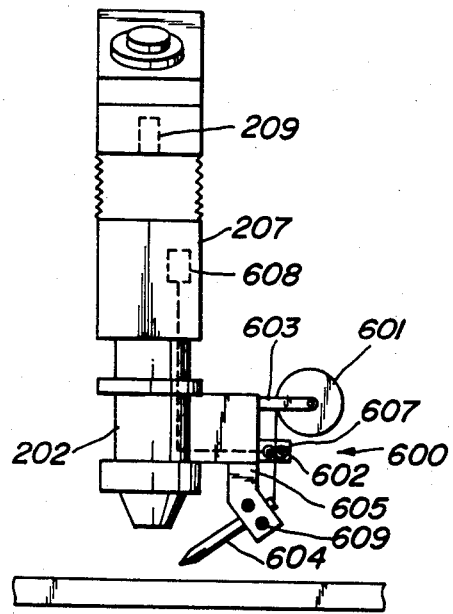
Figure 26A:
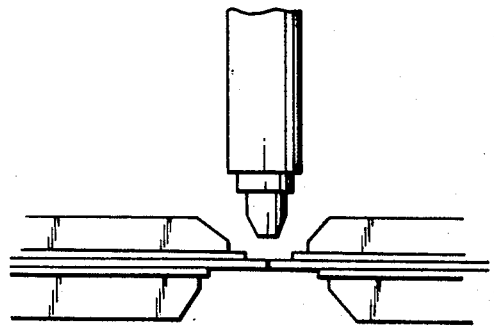
Figure 26B:
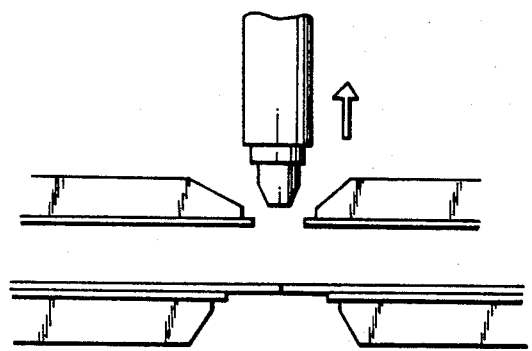
Figure 27A:
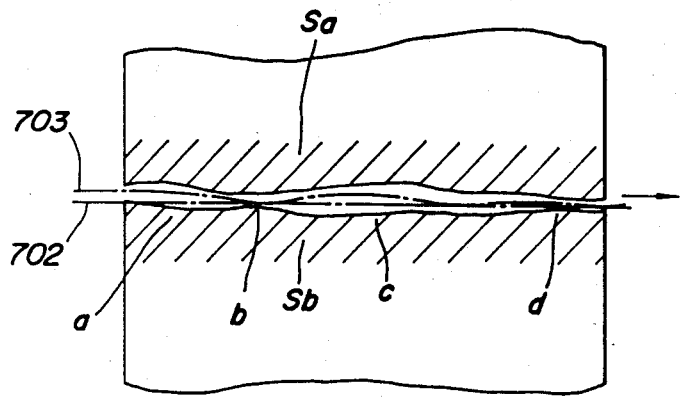
Figure 27B:
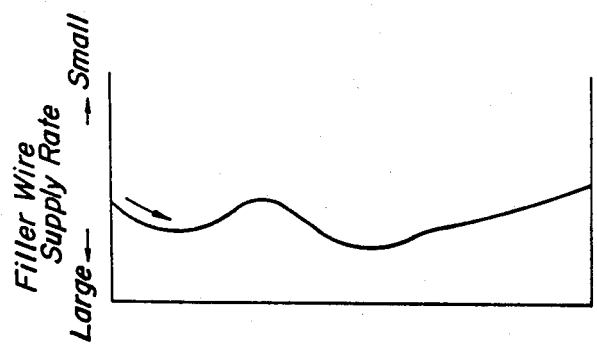
Figure 29:
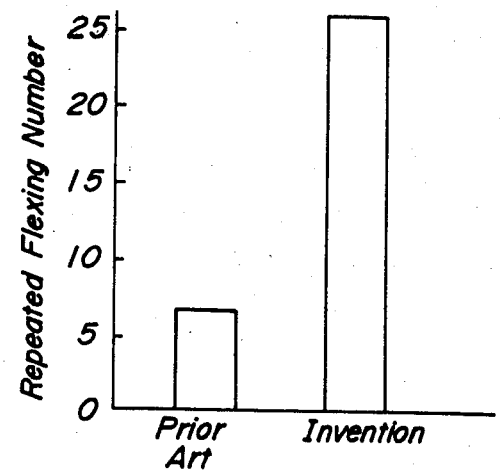
Figure 30:
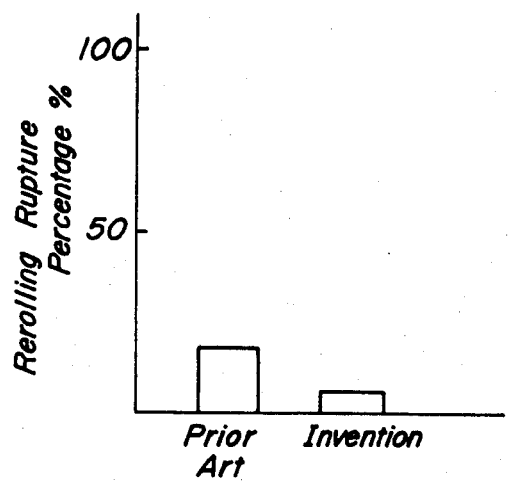

FIGS. 16(a)–16(f) are views schematically illustrating the operation of the laser butt welding apparatus according to the present invention;

FIG. 17 is a graph illustrating the relation between the distance l from a tip of an upper clamp to an edge of an upper blade of the shear and a value $\Delta G$ which is obtained by subtracting the minimum value of the distance between the cut preceding steel strip and the cut trailing steel strip in the width direction of said steel strip from the maximum value;

FIG. 18 is a schematic view illustrating the value $\Delta G$ in FIG. 17;

FIG. 19 is a graph illustrating the relation between tan $\alpha$ in which $\alpha$ is a rake angle of a shear, the value $\Delta G$ and the thickness of the steel strip;

FIG. 20 is a schematic view illustrating a sectional profile of the welded portion formed when the center of the laser beam is deviated from a butt line;

FIGS. 21(a) and 21(b) are side and plan views of another embodiment of the laser beam path construction in the laser torch respectively;

FIGS. 22(a) and 22(b) are side and plan views of still another embodiment of the laser beam path construction of a laser torch;

FIG. 23 is the relation among the laser beam, a filler wire guide pipe, and the steel strip plate;

FIG. 24 is a side view of a filler wire feed means attached to a laser torch;

FIG. 25 is a side view of another filler wire feed means attached to a laser torch;

FIGS. 26(a) and 26(b) are views illustrating the operation of upper clamps and the torch;

FIG. 27(a) is a graph illustrating the shape of a gap formed between butted edges of members to be welded together;

FIG. 27(b) is a graph illustrating the supply rate of a filler wire to be supplied along the gap formed between the butted edges as shown in FIG. 27(a) when the laser butt welding is carried out according to the present invention;

FIG. 28 is a schematic sectional view of a laser butt welding apparatus according to the invention having means for detecting the size and the location of the center line of the gap between the butted edges of steel strips to be welded;

FIG. 29 is a graph showing the results of repeated flexing strength test conducted at a welded portion of the welded steel strips; and FIG. 30 is a graph illustrating the results of the broken rates in a re-rolling the welded steel strips each containing a welding line as compared between the present invention and the prior art.

DESCRIPTION OF THE PREFERRED EMBODIMENTS

Figure 1:
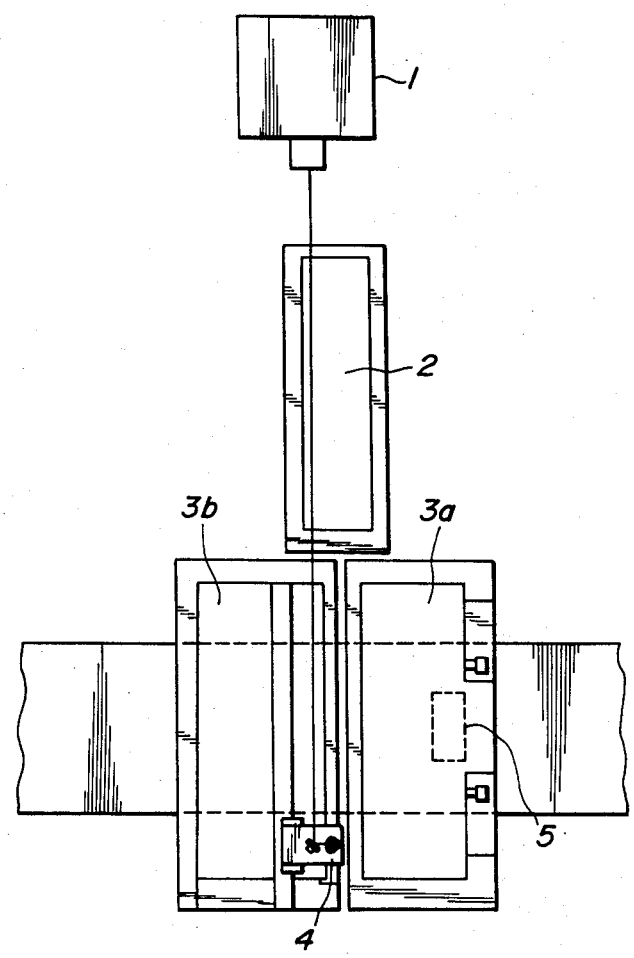
FIG. 1 is a schematic plan view of the whole laser butt welding apparatus according to the present invention.

The present invention will be explained more in detail with reference to the attached drawings below:

In FIG. 1, reference numerals 1, 2 and 3 are a laser oscillator, a double blade shear, and clamp means consisting of an inlet clamp 3a and an outlet clamp 3b respectively. Reference numerals 4 and 5 are a laser torch and a butting means respectively. The double blade shear 2, the clamp means 3 and the butting means 5 will be explained referring to FIGS. 2 and 3. Although the clamp means may be included in the butting means in view of the function, they are explained as separate members in the following:

In FIGS. 2 and 3, the double blade shear 2 has upper and lower blades 7 and 8 mounted respectively on the upper and lower arms 6a and 6b of a C-letter shaped frame 6. The blades 7 are vertically movable by means of a cylinder 7a, guide rods 7b and 7c secured to the upper arm 6a, while the lower blades 8 are vertically movable by means of a cylinder 8a, guide rods 8b and 8c secured on the lower arm 6b. Each upper blade 7 is provided with a rake angle in a transverse direction of the strip, which is selectively determined in such a range as to improve a shear-cut profile of the strips. The double blade shear 2 is so constituted that the C-letter shaped frame 6 is forwardly and rearwardly movable between the outlet clamp 3b and the inlet clamp 3a in a transverse direction of the steel strip while being guided by rails 10, by means of a drive means 9 (for instance, a cylinder). The inlet clamp 3a and the outlet clamp 3b are disposed on a stationary base 11 in opposite relation. The upper clamps 12a and 12b are both vertically movable with respect to the lower clamps 15a and 15b respectively by means of cylinders 14a and 14b secured to the upper frames 13a and 13b, so as to clamp or release the edge portions of steel strips fed on the line. The inlet clamp means 3a moves in the line direction on a lower base 33 of the stationary base 11 by means of a drive means, for instance, a cylinder 16, so that the means moves forwardly or rearwardly with respect to the outlet clamp means 3b. The outlet clamp means 3b is fixed without being displaced in the line direction.

Figure 4:
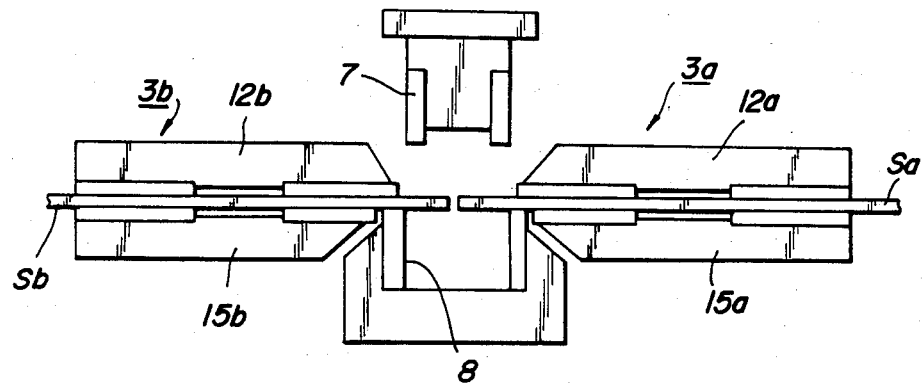
FIG. 4 is a detailed view illustrating the state in which a preceding steel strip and a trailing steel strip are clamped.

Next, the clamp means is explained in more detail referring to FIG. 4. Top ends of the upper clamp beams 12a and 12b of the inlet and outlet clamp means 3a and 3b are extended a little longer toward a shear-running line (or overlapping) than those of the lower clamp beams 15a and 15b, so that the steel strips Sa and Sb to be cut are clamped between the tips of the upper clamp beams 12a, 12b and the lower blades 8.

Figure 5:
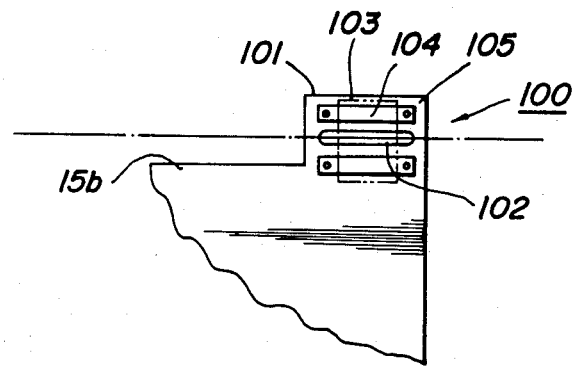
FIG. 5 is a plan view of a station for checking the performances of an optical system for irradiating a laser beam onto a weld zone.
Figure 9:
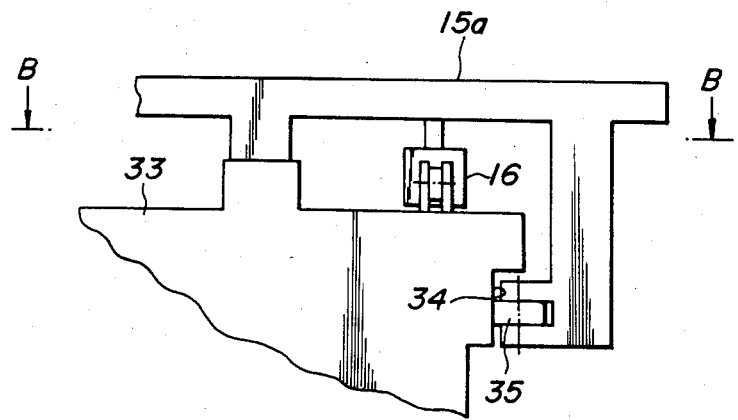
FIG. 9 is a sectional view as viewed from the direction of the arrow A—A in FIG. 8.
Figure 10:
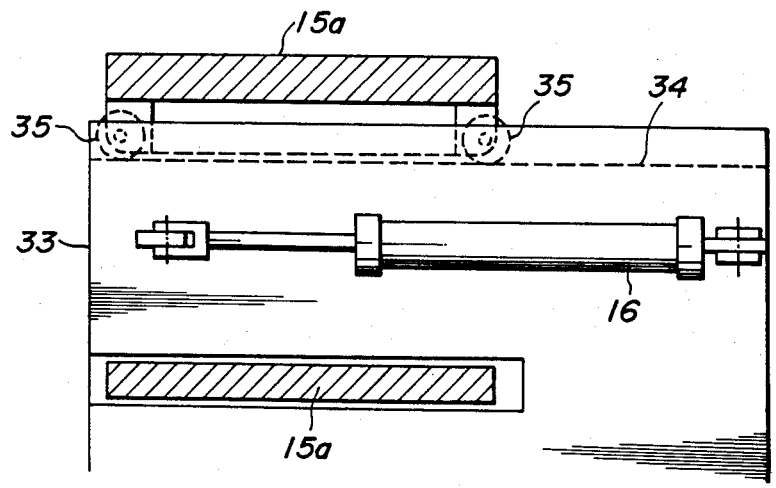
FIG. 10 is a sectional view as viewed from the direction of the arrow B—B in FIG. 9.

As shown in FIGS. 5 and 6(a), (b), a station 100 for checking the performances of an optical system for irradiating a laser beam on a weld zone of the steel strips is provided at the lower clamp base 15b on an off-line.

A reference numeral 101 is a table having a slit just under the laser torch. Numeral 103 is a sample plate which is secured to the table 101 by means of press plates 104 and bolts 105.

According to this embodiment, the table 101 is joined to the lower clamp base 15b, but it may be supported by a base 33.

Referring next to FIGS. 7-10, the butt means will be explained below.

An arm 17 is provided on the inlet clamp 3a. When the inlet clamp 3a is moved toward the outlet clamp 3b by means of the cylinder 16, it is stopped upon contact with the stopper 18 and the forward displacement thereof is restricted. Thus, when the steel strips are cut, the stopper 18 is located apart from the lower bent edge side of the arm 17 at a slightly larger distance as that of the gap between the edge faces of the strips cut by the shear.

A pressure detector 25 such as a load cell is provided at a contact face between the stopper 18 and the arm 17, so that the stopper 18 is movable by being guided with guide means 26. The stopper serves to set the gap between the butted edges of the shear-cut preceding and trailing steel strips smaller than the diameter of the filler wire. That is, a screw shaft 27 is screwed to the lower portion of the stopper 18, and the screw shaft is adapted to be rotated for shifting the position of the stopper 18 by actuating the motor 32 via bevel gears 28 and 29, a shaft 31 and bevel gears 30 and 30'. A stopper-positioning system comprising the bevel gears 28, 29, 30 and 30' and the shafts 27 and 31 are arranged onto a lower base 33. With this construction, it may be possible to stop the trailing steel strip at a place spaced from the shear-cut edge of the preceding steel strip, and to gently adjust the edge faces of the preceding and trailing steel strips to be separated by a specified distance by actuating the motor 32 from an output from the stopper or the like. As a matter of course. In this embodiment, the clamp means 3a provided with the arm 17 is movable by means of the cylinder 16.

In the above embodiments, two stoppers 18 are driven by means of a single motor 32, but as a matter of course, they may be driven independently by means of two motors.

Figure 11:
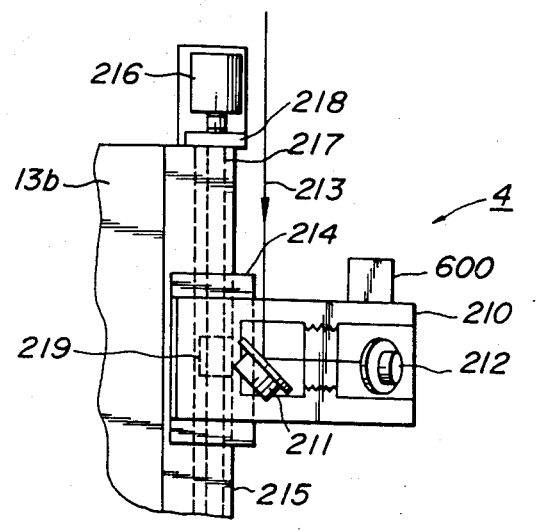
FIG. 11 is a plan view of a laser torch.
Figure 12:
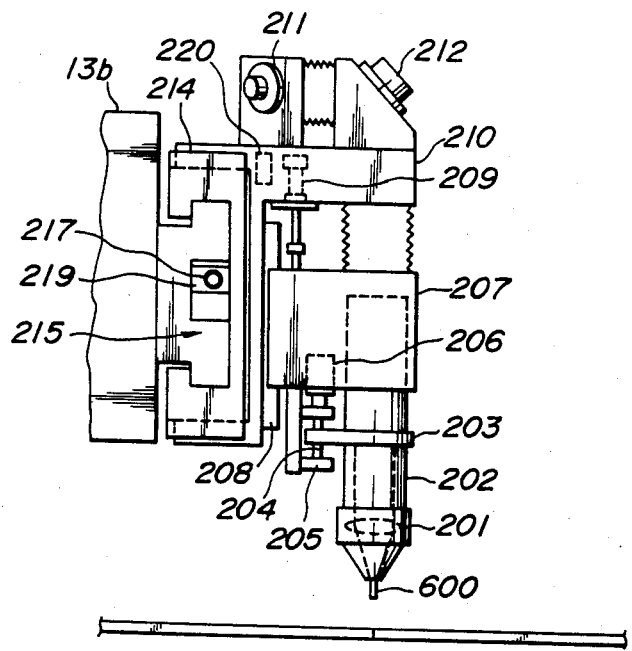
FIG. 12 is a side view of the laser torch in FIG. 11.

With reference to FIGS. 11 and 12, the laser torch 4 will be explained below.

A reference numeral 201 is a condenser which is attached to a torch 202. A reference numeral 203 is a bracket attached to the torch 202 and engaged with the screw axis 204 at its other end. The screw shaft 204 is supported by the bearing 205 at both ends thereof and connected to a motor 206. A reference numeral 207 is a torch holder which is adapted to ascend and descend while being guided by a guide means 208. This torch holder 207 also serves to guide the ascending and descending of the torch 202. A cylinder 209 is attached to a reflector base 210 and adapted to ascend and descend the torch holder 207. Reference numerals 211 and 212 are bender reflector attached to the reflector base 210, and adapted to bend the laser beam to a desired direction. The reflector base 210 is guided by a carriage 214 and can be moved in a direction perpendicular to the torch running direction by a motor 220.

The carriage 214 is adapted to be moved in a direction perpendicular to the processing line by means of a guide means 215, a motor 216, a screw shaft 217 connected to the motor 26, bearings 218 of the screw shaft 217, and a nut 219 screwed to the screw shaft 217.

A reference numeral 600 is a filler wire feed means which will be explained in detail with reference to FIGS. 24 and 25. In FIG. 24, the filler wire feed means is attached to the torch frame 207. As shown in FIG. 25, this filler wire feed means may be integrally attached to the torch 202 and adapted to move together with the torch.

A center clamp 300 will be explained with reference to FIGS. 3, 13 and 14.

The center clamp 300 is arranged at a side opposite to the laser torch at the butting portion of the preceding and trailing steel strip edge portions, and includes a backing bar 301 provided with a bag-like groove 302. The center clamp further comprises cylinders 303, guide rods 304 and guides 305, and is adapted to be contacted with or separated from the back face of the strips to be jointed. Reference numerals 306, 307 and 308 are a backing bar supporting base, a light absorbing member, and a coolant passage respectively. The backing bar 301 is designed to have such a size that the preceding steel strip and the trailing steel strip are fully sandwiched between it and the upper clamps 12a and 12b when elevated.

This bag-like groove 302 prevents the laser beam passed through the weld zone from reflecting and dispersing to the outside and further the safety is assured by preventing the laser beam from leaking to the outside by the provision of a light absorbing member 307 onto the face of a supporting base 306 onto which the laser beam is irradiated.

Further, since the edge portions of the preceding and trailing steel strips are clamped between the upper clamps 12a and 12b and the backing bar 301 during the butting, the deformation of the strip tip portions as shown in FIG. 15 can be avoided.

The filler wire is applied to the weld zone as follows:

The preceding and trailing edge portions are cut by the double blade shear, and the inlet clamp is displaced toward the outlet clamp means and the forward displacement is restrained by the stopper 18. The most advanced positioning is done to set the gap between the edges of the butted preceding and trailing steel strips smaller than the diameter of the filler wire used. Then, the torch is displaced to focalize the beam center at the gap center, and the filler wire feed means is positioned to make the center of the filler wire supplied therefrom to be included in a gap and slightly advanced from the laser beam center. Thereafter, the filler wire is supplied onto the weld zone from a fore direction with respect to the welding direction and the welding is effected, while the filler wire is fused with the laser beam. Upon repeated investigations, the inventors have found that the welding strength is greatly influenced by an angle $\theta$ at which the initial feed line of the filler intersects with the surface of the steel strip, the distance l between a point at which the filler wire is brought into contact with the steel strip surface and an intersection between the beam center and the steel strip surface, and a distance L from the tip of a wire guide tube to the intersection between the beam center and the steel strip surface (see FIG. 23).

The length l is a contact length required for properly placing the filler wire in the gap set smaller than the diameter of the filler wire. In other words, the side edges of the shear-cut preceding and trailing steel strips properly serve to locate the filler wire fed in the length l.

Further, there has been considered a filler wire feeding means in the invention as shown at 600 in FIG. 24 for feeding the wire onto the weld zone. The filler wire feed means includes a filler wire reel 601 for storing the filler wire, a feed rolls 607 for feeding the filler wire stored in the reel through rotation by means of a motor 608 while the filler wire being sandwiched therebetween, and a guide tube 604 for guiding the filler wire toward the weld zone. The reel and the feed rolls are attached to the torch holder 207 through support means 603 and 602 respectively, while the guide tube 604 is attached to the torch by support means 605 and 606. The guide tube is designed to have an inner diameter of substantially the same as the outer diameter of the filler wire, and it serves to guide the filler wire fed from the feed rolls 607 toward the weld zone, while straightening the curved or bent filler wire. In general, it is necessary to open the clamp means clamping the preceding and trailing steel strips immediately after the completion of the welding so as to make the weld cycle time as short as possible and re-start the processing line. Thus, the torch when the welding has been completed must be retracted to a position above the clamps by a specific distance before the clamping is opened so that the interruption of the torch to the clamp may be avoided [FIGS. 26(a) and 26(b)]. For this purpose, the ascending and descending cylinder 209 is actuated to lift the torch 202. However, since the wire reel and the feed rolls are secured to the stationary torch holder, the upper movement of the torch may cause the filler wire to be bent between the guide tube 604 and the filler rolls 607. Such bent wire may not recover the original straightly form even if it is passed through the guide tube, so that the filler may not be fed to the weld zone in an appropriate state. If the distance between the feed rolls 607 and the guide tube 604 is too long, the wire having a fine diameter is low in the rigidity and such a wire is liable to be bent between the roller and the tube due to the resistance at the guide tube.

FIG. 25 shows another embodiment of the filler wire feed means according to the invention when it is anticipated that the filler wire is bent at the time of the upper movement of the torch.

A reference numeral 601 is a wire reel for storing the filler wire, and a reference numeral 607 is means (rolls) adapted for feeding the filler wire stored in the reel while being rotated by a motor 608 sandwiching the filler wire therebetween. A reference numeral 604 is a guide tube adapted for guiding the filler wire fed by the filler rolls 607 into the weld zone and adjustable by rolls 609. The inner diameter of the guide tube is designed to be substantially the same as the outer diameter of the filler wire, so that the filler wire is fed onto the weld zone, while curved or bent filler wire is being straightened. The filler wire feed means 600 which comprises the filler wire reel 601, a filler wire feed rolls 607 and the guide tube 604 is integrally attached to the torch 202 by support means 603, 602, 605. Reference numeral 605 is support means for supporting the guide tube 604 and may be adjustable in terms of its inclination angle and the distance up to the torch by an appropriate means (not shown).

When the torch is intended to be ascended or descended, the cylinder 209 (see FIGS. 11 and 12) is actuated. At that time, since the filler wire feed means is integrally fitted to the torch, it is ascended or descended together with the torch. With this construction, the positional interrelation between the wire reel, feed rolls and the guide tube is not varied irrespective of the torch movement. Thus, the filler wire is not bent or curved between the feed rolls 607 and the guide tube 604. Further, by reducing the distance between the feed rolls and the guide tube, it is possible to prevent the wire having a small diameter from bending between the feed rolls 607 and the guide tube 604.

The operation of the apparatus according to the present invention will be explained with reference to FIGS. 16(a)–16(f) below:

(1) When the edge portions of the preceding steel strip and the trailing steep strip are fed and stopped at predetermined locations, the cylinders 14a and 14b of the inlet and outlet clamp means 3a and 3b are actuated to clamp the preceding steel strip and the trailing steel strip between the clamping means. Next, the cylinder 8a is actuated to lift the lower blades 8 [FIG. 16(a)].

(2) The cylinder 7a is actuated to descend the upper blades 7 to cut the edge portions of the preceding steel strip and the trailing steel strip [FIG. 16(b)].

(3) The cylinder 7a is reversely actuated to lift and retract the upper blades 7 and the cylinder 8a is actuated to descend the lower blades 8. Then, the cylinder 9 is actuated to move the shear 2 to a retracted position on the non-operation side [FIG. 16(c)].

(4) The cylinder 16 is actuated to advance the inlet clamp means 3a, and when the top of the trailing steel strip approaches the tail edge portion of the preceding steel strip [FIG. 16(d)], a cylinder 303 of a center clamp 300 is actuated to clamp the steel strips between the upper clamps or clamp beams 12a and 12b and the center clamp 300 [FIG. 16(e)]. Next, the torch 202 is positioned near the butted edges of the preceding and trailing steel strips [FIG. 16(f)].

The edge portions of the steel strips are prevented from being deformed as shown in FIG. 15 by clamping the edge portions between the extended tip portions of the upper clamps and the center clamp. Thus, an excellent welded joint is obtained.

(5) The motor 216 is actuated to drive the torch laser in the transverse direction of the steel strip. In the way, when a detector not shown detects the side end of the strip, the filler wire begins to be fed, and then a shutter housed in the laser oscillator 1 is opened to irradiate the laser beam onto the side of the laser torch 4 after a predetermined time interval from the filler wire feeding. The laser beam is bent in a direction parallel to the line by means of a bender reflector 211, and is next bent in a direction vertical to the line by means of a bender reflector 212 and then passed through the condenser 201 to be focused onto a weld zone and to commence the welding while fusing the fed filler wire. The laser torch is run in the transverse direction of the strips. When the other strip side end is sensed by means of the side end detector, the feeding of the filler wire is stopped and then the irradiation of the laser beam after a predetermined time interval since the filler wire feeding is stopped. Then, the torch is carried to the retracted position and stopped.

When the gap between the butted edges of the steel strips is not uniform as shown in FIG. 27(a), the supply rate of the filler wire and/or the running speed of the torch is controlled. FIG. 27(b) shows a control method to ensure that the filler wire supply rate may be in proportion to the size of the gap.

The filler wire supply rate is controlled as follows:

The location of the center and the size of the gap are detected, and the torch is displaced so that the center of the laser beam conforms with the center of the gap, while the supply rate of the filler wire is controlled to be in proportion to the size of the gap. By the way, while the filler wire supply rate is kept constant, the running speed of the laser torch may be so controlled that the amount of the filler wire supplied and fused may be in proportion to the size of the gap. An apparatus according to the present invention for effecting the above operation will be explained with reference to FIG. 28, in which the like parts are denoted by the same reference numerals as given above.

A reference numeral 701 is a light irradiator which is located over the butted edges of the steel strips. It may be located under and on the side of the butted steel strips. The light irradiator is arranged to irradiate the butted edges with a light beam. A reference numeral 702 is a light receiving element such as a photo diode array for detecting the size and the center of the gap between the butted edges through which the light is reflected or passed. The light irradiator 701 and the light receiving element 702 are attached to the torch holder and adapted to be moved together with the movement of the torch. The tip of the light receiving element 702 is positioned slightly in advance on a welding line. A reference numeral 703 is a control means including an arithmetic circuit and a memory means, which controls the center of the laser beam to coincide with the center line of the gap between the butted edges of the strips and the rate of the filler wire supplied to be in proportion to the size of the gap based on the detected signal from the light receiving element 702. That is, the size of the gap and the location of the center line of the gap are determined based on the signal from the light receiving element in the arithmetic circuit and stored in the memory means. When the laser butt welding is carried out, the information from the memory means is transmitted to the motor 220 and the motor 608 to control the beam center and the amount of the filler wire. When the light receiving element is arranged so as enable to detect the light reflected or passed through a portion to which the laser butt welding is just applied, the memory means may be omitted.

The rate of the filler wire supplied is controlled to be varied as shown in FIG. 27(b). In such a manner, the laser beam is run at the center line of the gap between the butted edges of the steel strips and the filler wire is supplied in a necessary and adequate amount to fill the gap depending upon the size of the gap.

In the laser butt welding method and apparatus for effecting the method according to the invention, the welding strength is conspicuously improved as compared with the prior art. With respect to each sample plate of Special Steel SK 5 and having a welded portion, the repeated flexing strength test was carried out, and the broken rate was determined when each steel strip having a welded line was rolled. The results are shown in FIGS. 29 and 30. From these figures it can be seen that the repeated flexing strength is far more excellent in the present invention than in the conventional case, and the broken rate of the re-rolling in the invention is improved more than 2 times than in the case of the conventional case.

As mentioned above, according to the invention, an optimum welding strength can be stably obtained irrelative to the shape of the gap between the butted edges of the members to be joined and/or without causing the deficiency and excess in the amount of the fused filler wire.

Moreover, since the strength of the welding joint portions is satisfactorily high and uniform, a post treatment can be reliably done to the joined (welded) steel strips.

Next, the optical path of the laser beam in the apparatus according to the invention will be explained with reference to FIGS. 11 and 12.

By once changing the laser beam path in parallel to the line in the laser torch 4, the focused position in the line direction of the laser beam path posterior to the reflector 212 can be varied merely by shifting the reflector 212 in a horizontal direction.

Particularly, when the laser beam or the like is used, the beam path may be slightly varied depending upon the circumferential temperature, a leading period of time of the oscillator, a temperature of the reflector, and the like, and consequently there is the possibility that the beam point focused by the condenser is shifted slightly. The shift component of the focus in the direction perpendicular to the processing line is no problem because it is in a weld line, while if the focus is shifted in the direction parallel to the line, it is deviated from the butting line to form a weld profile as shown in FIG. 20. Since this form of the joint has a notch in the lower side, it is weak in bending and unacceptable. For this reason, it is extremely important to control the focus location in the direction parallel to the line in using the laser butt welding apparatus. According to the laser butt welding apparatus of the invention, in order to facilitate the positioning of the focus in the line direction, the laser beam path is bent in parallel to the line at least one time. Then the optical system (after such a bending step) is moved to a horizontal direction, whereby the focus can be moved in a direction parallel to the line by the same distance as the amount of the optical system moved without moving the focus to the vertical direction and the direction perpendicular to the line and the operation for positioning the focus can be very easily effected.

In the following, other embodiments of the optical system adapted to bend the laser beam path to the direction parallel to the line at least one time will be explained hereinafter.

In FIG. 21, a reference numeral 401 is a first reflector adapted to bend the laser beam 213 incident thereupon in a direction perpendicular to the line, in the vertical direction to the line, a reference numeral 402 is a second reflector adapted to bend the laser beam thus vertically bent in the direction parallel to the line, and a reference numeral 403 is a condensing reflector adapted to focus the laser beam in parallel to the line thus bent, at a weld zone.

Merely by displacing the condensing reflector 403 in the line direction, the focus is shifted by the same distance as this displacement only in the direction parallel to the line without being shifted in the vertical direction or perpendicular direction to the line.

The focusing is carried out by moving the reflector 402 and the condensing reflector 403 as one set in a vertical direction.

FIG. 22 shows another embodiment using a condensing reflector.

A reference numeral 501 is a first reflector adapted to bend the laser beam 213 incident thereupon in the direction perpendicular to the line, in the direction parallel to the line, a reference numeral 502 is a second reflector adapted to vertically bend the laser beam thus bent, in the direction parallel to the line, a reference numeral 503 is a third reflector adapted to bend the thus vertically bent laser beam in the direction parallel to the line, and a reference numeral 504 is a condensing reflector adapted to focus the laser beam at the weld zone.

According to this embodiment, by displacing the condensing reflector 504 in the direction parallel to the line, the focus point is shifted by the same distance as displacement of the condenser reflector in the parallel direction without being displaced vertically or in the direction perpendicular to the line.

The focusing is carried out by vertically shifting the reflector 503 and the condensing reflector as one set.

(6) When the welding is completed, the upper clamps or clamp beams 12a, 12b of the inlet and outlet clamp means 3a, 3b are lifted to release the edge portions of the preceding and trailing steel strips, and the passing of the steel strip starts.

Subsequently, the cylinder 209 is actuated to lift and return the laser torch to the original position, and the other means are returned to their original locations. Thereby, one weld process is completed.

In the above described step (3) for cutting the steel strips, it is particularly important that the cut lines formed through the above cutting operation are in parallel to each other and straight in the case of the laser welding. That is, when the laser beam is condensed by the condenser, the diameter of the laser beam at the focus is varied according to the focal length of the condenser, for instance, when a condenser having a focal length of 5 inches is used, the diameter is as extremely small as 0.15 mm. Therefore, according to the laser butt welding, it is possible to increase the energy density and to effect a high speed welding, but an extremely high precision is required in butting of the materials to be welded. If the cut lines of the materials to be welded are curved, a non-uniform clearance is created even if the butting is effected at a very high precision. In general, when the steel plate is cut by means of a raked shear (guillotine shear, rotary shear or the like), the cut line is more or less curved as shown in FIG. 18 in a transverse direction of the plate. The curved degree of the cut line depends upon the material, clamping way, shear or the like, but it is observed that the cut line is curved at about 0.1 mm in the case of a steel plate having a thickness of 1.0~3.0 mm. Thus, even if such curved-edge steel strips are butt-welded, not welded joints having satisfactory strength can be obtained.

According to the present invention, it is possible to obtain a set of steel strips having parallel and nearly straight cut lines by clamping the edge portions of the steel strips between the upper clamps or clamp beams 12a and 12b which are more extended toward the shear than the lower clamp or clamp beams 15a and 15b and the upper end portion of the lower blade 8. FIG. 17 shows the relation of the distance l from the edge of the upper clamp to the tip face of the upper blade to a value ΔG obtained by subtracting the minimum cut gap (Gmin) from the maximum cut gap (Gmax) among the cut gaps measured in the transverse direction of the strip (see FIG. 18). Table 1 shows the results obtained when the above described cut edge portions are butted and the butted portion is subjected to the laser butt welding.

TABLE I

| Distance | (Tensile test) Plate thickness (mm) | | | |
|---|---|---|---|---|
| l (mm) | 1.0 | 1.6 | 2.2 | 3.0 |
| 15 | Δ | x | x | x |
| 10 | Δ | Δ | Δ | x |
| 7 | o | o | o | o |
| 5 | o | o | o | o |
| 3 | o | o | o | o |

Note:
o Rupture of base metal
Δ Rupture of base metal or welded joint
x Rupture of welded joint From the above data, it can be seen that the excellent welding is possible in a range of l being not more than 7 mm. In a range of $7 < l \leq 15$, the rupture at the welded portion is likely to be caused and there is problem in plate-passing, rolling or other processing steps of the strip. In FIG. 17, the zones (a), (b) and (c) correspond to the steel strips having thickness (t) of 1.0 mm, 1.6 mm and 3.0 mm respectively. The welding conditions in the test of Table 1 are as follows, that is a laser power is 1 kw, the materials are cold-rolled steel strip and hot-rolled steel strip (low carbon steel) and the welding speed is 1.0–3.0 m/min.

In the Table 1, the marks (Δ) means that the tensile strength when the welded joint portion is ruptured, is about 80–100% of that of the base metal and the mark (X) means about 40–80% thereof.

Thus, the steel strips of the mark (Δ) satisfactorily endure the plate-passing in the processing line, while a part of the steel strips of the mark (X) (l=10, t=3.0 mm) has the tensile strength near 80% of that of the base metal and therefore, they also satisfactorily endure the plate-passing in the processing line.

When the l can not be set to be not more than 10 mm for the reason that the extended portion of the upper clamp interferes with a nozzle portion of the laser torch, the following system is proposed. FIG. 19 shows a relation of tan α (α: shear rake angle) to the above described value ΔG and the results obtained by performing the tensile test with respect to the welded portions formed by effecting the laser butt welding by using the cut strips under the condition of tan α and ΔG shown in FIG. 19.

From these results, it is understood that the smaller tan α, the smaller is the curve of the cut lines and as the results the welding results are better. According to the test results it has been found that when the range of tan α is $(35+2.5t)/1,000$ in which t denotes the thickness of the steel strip, the strength of the joints is high. FIG. 19 is an example when l is 15 mm. In the case of l=12 mm or 20 mm, similar results were obtained.

Even when l is not more than 10 mm, the curve of the cut line may be more reduced by making tan α smaller and the good welded joint can be stably obtained.

The smaller the tan α, the smaller the curve of the cut line is, but the shearing-cut force becomes larger in proportion to tan α and the strength of the frame strength is needed and the equipment cost is increased.

Therefore, the lower limit for the practical range of tan α is about 4 t/1,000. That is, the lower limit is 2.4/1,000 in the case of 0.6 mm in thickness, 12/1,000 in the case of 3 mm in thickness and 18/1,000 in the case of 4.5 mm in thickness.

Next, the use of the station 100 for checking the performances of an optical system for irradiating the laser beam on the weld zone will be explained below:

The condensing performance of the condenser is deteriorated owing to a long period of time of use, or the condenser is broken or damaged due to the spattered metal. Therefore, the condenser should be exchanged at a specific time interval or at an irregular time interval. At such a time, the tip portion of the condenser is removed and a fresh one is attached. In this exchange operation, the welding apparatus restores the normal state, and becomes applicable in the processing line. Usually, the deterioration period of the condensing performance is not constant, and the usable time period is unclear. Further, there is no way to detect the deterioration degree of the condenser other than the difference between the output of the laser beam prior to and after passing through the condenser or the variation of the depth of the laser beam penetrated. In addition, it is also necessary to check whether the fresh one which is exchanged exhibits a predetermined performance or not. If such checking operations are carried out on the line, the line operation must be stopped during such checking.

For solving the above drawbacks, according to the invention, the station 100 for checking the performances of the optical system is provided at a position on the line extended from the laser torch running line for welding, where the passing of the steel strip is not interrupted, so that the above described working for the condenser can be carried out during the time when the steel strips are passed on the line, whereby the productivity is increased.

The station for checking the performances of the optical system is used as follows:

First, the laser torch 4 stopped at a predetermined retracted position on the operational side is carried to the station for checking the performances of the optical system by actuating a motor 216. Next, a sample plate 103 is placed on a table 101, and secured onto the table by means of press plates 104 and bolts 105. Then, the laser torch is run over the sample plate to irradiate said plate with the laser beam and then the color of the reflected beam and the depth of the weld penetration are checked and it is checked whether the focus of the condenser is proper or not or whether the condensing performance has been deteriorated or not. This is utilized to check the distribution of the laser beam intensity and the deviation of the laser beam axis from the butted line.

FIG. 6(b) is another embodiment of the station for checking the performances of the optical system in which the lower portion of the slit is closed for preventing the penetration or scattering of the laser beam.

The following Table 2 shows the comparison of the welding time of the laser butt welding according to the invention with the TIG are welding. The comparison was made with respect to two kinds of steel strips having a thickness of 1.0 mm and 2.3 mm. The laser power is 1 or 3 kw and torch-running distance in the laser butt welding and TIG arc welding is 1.5 m. It is understood from this table that with respect to the same thickness of the steel strips, the welding time in the laser butt welding is less than 0.5 time as short as that of the TIG are welding.

TABLE 2

| Welding method | Plate thickness (mm) | Laser power (kw) | Welding speed (cm/min) | (1) Welding time (sec) | (2) Operating time before and after the welding (sec) | (1) + (2) Total time (sec) |
| --- | --- | --- | --- | --- | --- | --- |
| TIG | 2.3 | 4 | 30 | 130 | 30 | 210 |
| TIG | 1.0 | 2 | 60 | 90 | 30 | 120 |
| Laser butt (Invention) | 2.3 | 1 | 150 | 60 | 30 | 90 |
| Laser butt (Invention) | 1.0 | 1 | 500 | 20 | 30 | 50 |
| Laser butt (Invention) | 2.3 | 3 | 400 | 25 | 30 | 55 |

The following Table 3 shows the test results obtained in the tensile tests with respect to the welded portions of various steel strips by using the laser butt welding apparatus according to the present invention. The width of the test steel strip is 914–1,067 mm, and five test pieces are cut off in the width direction and the test is made with respect to these test pieces. In all the test pieces, the rupture occurs at the base metal and the welding strength is excellent.

TABLE 3

Mechanical property of laser welded joints (Laser power 1 kw) Tensile strength

| Steel | | Thickness (mm) | Welding speed (m/min) | Tensile strength (kg/mm²) | Location of rupture |
| --- | --- | --- | --- | --- | --- |
| Mild | | 1.0 | 4.0 | 31 | Base metal |
| High-tensile | | 1.0 | 4.0 | 40 | " |
| Calvanized | | 0.9 | 3.5 | 31 | " |
| Silicon | | 2.0 | 1.25 | 60 | " |
| Stainless | SUS304 | 2.0 | 1.25 | 62 | " |
| | SUS430 | 1.0 | 4.0 | 49 | " |

Table 4 shows the results on the welding test using the apparatus according to the invention while the l, L and θ are varied. As may be understood from this table, it is preferable that the interrelation between the torch and the filler wire feed means is set such that l is in a range of 1–5 mm, L is not more than 20 mm and θ is not more than 35°.

TABLE 4

| Distance | Feed angle | | | |
| --- | --- | --- | --- | --- |
| | θ = 20° | θ = 30° | θ = 40° | θ = 50° |
| L = 10, l = 3 | o | o | x | x |
| L = 10, l = 5 | o | o | x | x |
| L = 10, l = 8 | x | x | x | x |
| L = 20, l = 3 | o | o | x | x |
| L = 20, l = 5 | o | o | x | x |
| L = 20, l = 8 | x | x | x | x |
| L = 30, l = 3 | x | x | x | x |
| L = 30, l = 5 | x | x | x | x |

TABLE 4-continued

| Distance | Feed angle | | | |
| --- | --- | --- | --- | --- |
| | θ = 20° | θ = 30° | θ = 40° | θ = 50° |
| L = 30, l = 8 | x | x | x | x |

Note:
o ... Good (Welding was carried out continuously over the whole weld zone.)
x ... Bad (Welding was carried out discontinuously.)

The invention can exhibit the following merits:
(1) The welding time can be reduced.
(2) The productivity is higher.
(3) All kinds of the steels, for instance, special steels such as silicon steel, stainless steel or the like, a plated steel such as a galvanized steel sheet or the like, and high tensile strength steels by using the laser butt welding apparatus according to the invention.
(4) Since no projected portion at the weld portion is formed, the formation of faults caused when coiling can be reduced.
(5) The strength at the welded portions is improved, so that no rupture of the welded portion occurs in the line.
(6) Even when the gap between the butted edges of the steel strips is not uniform, an appropriate welding strength can be obtained over the whole weld zone by controlling the filler wire feed rate and the center of the laser beam.

What is claimed is:

1. A laser butt welding apparatus comprising an inlet clamp means and an outlet clamp means, at least one of which is movable forward and rearward along a steel strip-feed line direction, and which are adapted to clamp the edge portions of a preceding steep strip and a trailing steel strip, each of said inlet and outlet clamp means having an upper clamp beam and a lower clamp beam, the upper clamp beams of said inlet and outlet clamp means extending nearer to each other than the lower clamp beams of said inlet and outlet clamp means, shearing means consisting of a preceding steel strip shear and a trailing steel strip shear each having a lower shearing blade and an upper shearing blade which are independently movable upward and downward, said shearing means being advanceable and retractable between said inlet and outlet clamp means in a perpendicular direction to the line and adapted to cut the edge portions of the preceding and trailing steel strips by lowering the upper shearing blades while in said shearing, the edge portions of the preceding and trailing steel strips being firmly sandwiched between the lower shearing blades and the upper clamp beams, means for butting the cut edge portions of the preceding and trailing steel strips while being clamped by means of said clamp means, means for continuously feeding a filler wire at a weld zone at which a laser beam is condensed, laser torch means comprising a laser oscillator placed on an off-line, a bender mirror adapted to bend a laser beam irradiated from said laser oscillator, a condenser adapted to condense the laser beam reflected by the bender mirror at a weld zone, and a torch member for applying the laser beam focused by said condenser, which torch member is movable in a width direction of steel strips to be joined, and a center clamp arranged at the opposite side to the laser torch member, and adapted to clamp the butted edge portions of the preceding and trailing steel strips in cooperation with the upper clamp beams when welding is started, so as to avoid the deformation of the steel strips tip portions, the butting means being provided with means for setting a gap, between the butted cut edge portions of the preceding and trailing steel strips, at a distance smaller than the diameter of the filler wire.

2. The apparatus according to claim 1, wherein the laser torch means comprise an optical system by which the laser beam is straightly run in a direction parallel to the steel strip-feed line at least one time when the laser beam is fed to the weld zone from the laser oscillator.

3. The apparatus according to claim 2, wherein the optical system comprises a reflector adapted to bend the laser beam incident thereupon in the perpendicular direction to the line into a direction parallel to the line, a reflector adapted to vertically bend the laser beam bent in the direction parallel to the line, and a condenser adapted to focalize the thus vertically bent laser beam at the weld zone.

4. The apparatus according to claim 2, wherein the optical system comprises a reflector adapted to vertically bend the laser beam incident thereupon in the perpendicular direction to the line, a reflector adapted to bend the vertically bent laser beam in the direction parallel to the line, and a condensing reflector adapted to focalize the laser beam thus bent in the direction parallel to the line at the weld zone.

5. The apparatus according to claim 2, wherein the optical system comprises a reflector adapted to bend the laser beam incident thereupon in the direction perpendicular to the line into the direction parallel to the line, a reflector adapted to vertically bend the laser beam thus bent in the direction parallel to the line, a reflector adapted to introduce the thus vertically bent laser beam to a condensing reflector, and the condensing reflector which focalizes the laser beam to the weld zone.

6. The apparatus according to claim 1, wherein tip portions of the upper clamp beams of said inlet and outlet clamp means are extended over those of the lower clamp beams of said inlet and outlet clamp means, so that the edge portions of the steel strips are sandwiched between said extended tip portions and the upper edges of the lower shearing blades, and a distance between a respective one of said extended tip portions and the side edge of an adjacent upper shearing blade is not more than 10 mm.

7. The apparatus according to claim 1, wherein tan $\alpha$ of the upper shearing blades in which $\alpha$ is a rake angle is not more than $(35+2.5t)/1,000$ in which t is a thickness (mm) of the steel strips.

8. The apparatus according to claim 1, wherein the gap setting means of the butting means comprises a fixed guide member adapted to move and guide the movable clamp means in the steel strip-feed line; a supporting member of the movable clamp means which is in a sliding relation to the guide member; a drive means adapted to slide the supporting member of the movable clamp means with respect to the above-described guide member; and a movable stopper adapted to limit advance of the supporting member of the movable clamp means so that the gap between a cut edge portion of a preceding steel strip and a cut edge portion of a trailing steel strip is smaller than a diameter of the filler wire.

9. The apparatus according to claim 1, wherein the filler wire feed means comprises a reel adapted to store the filler wire; rollers adapted to feed the filler wire from the reel and a guide tube adapted to guide the filler wire from the feed rollers to a weld zone, said filler wire feed means feeding the filler wire under such a condition that an angle between the steel strip and the fed filler wire is not more than 35°, a distance from a contacting point of the filler wire with the steel strip plane to the intersecting point of the laser beam optical axis with the steel strip plane is 1–5 mm, and a distance from the tip of the guide tube of the filler wire to the intersecting point of the laser beam optical axis with the steel strip plane is not more than 20 mm.

10. The apparatus according to claim 1, wherein said filler wire feed means comprises a reel for storing the filler wire, rolls for feeding the filler wire from the reel, and means for guiding the filler wire fed from the feed rolls onto the weld zone, and the filler wire feed means is integrally fixed to the torch member.

11. The apparatus according to claim 1, further comprising a motor adapted to displace the torch member in the processing line, means for detecting the size and location of the center line of the gap between the butted edges of the steel strips, and means for controlling the location of the laser torch member and the supply rate of the filler wire based on an output signal from the detecting means, whereby the laser beam is run at the center of the gap between the butted edges, while the filler wire supply rate is controlled according to the size of the gap.

12. The apparatus according to claim 1, further comprising a motor adapted to displace the torch member in the processing line, means for detecting the size and location of the center line of the gap between the butted edges of the steel strips, and means for controlling the location of the laser torch member and the supply amount of the filler wire based on an output signal from the detecting means, whereby the laser beam is run at the center of the gap between the butted edges, while the amount of the filler wire is made in proportion to the size of the gap by changing the running speed of the torch member.

13. The apparatus according to claim 11 or 12, wherein the detecting means comprises a light irradiator and a light receiving element, and the controlling means comprises an arithmetic circuit for determining the size and location of the center line of the gap and outputting an output signal for controlling the location of the torch member and the filler wire supply rate.

14. The apparatus according to claim 11 or 12, wherein the control means further comprises a memory means for memorizing the data on the size and location of the center line of the gap and outputting an output signal upon necessity.

15. The apparatus according to claim 2, wherein said apparatus comprises a station adapted for checking the performances of the optical system for irradiating the laser beam on the weld zone and arranged on a line extended from the laser touch member running path.

16. The apparatus according to claim 1, wherein the upper clamp beams of said inlet and outlet clamp means have extended tip portions overlapping the lower clamp beams of said inlet and outlet clamp means, and said center clamp is arranged under the butting portion of the steel strips and accessible thereto, and adapted to clamp the edge portions of the steel strips between said extended tip portions and the upper edges thereof.

* * * * *